Jan. 16, 1951      E. C. RUEHLE      2,538,044
BELT SANDER ATTACHMENT FOR POWER TOOLS
Filed June 1, 1948      5 Sheets-Sheet 1

INVENTOR.
ELMER C. RUEHLE,
BY
ATTORNEY.

Jan. 16, 1951        E. C. RUEHLE        2,538,044
BELT SANDER ATTACHMENT FOR POWER TOOLS
Filed June 1, 1948        5 Sheets-Sheet 2
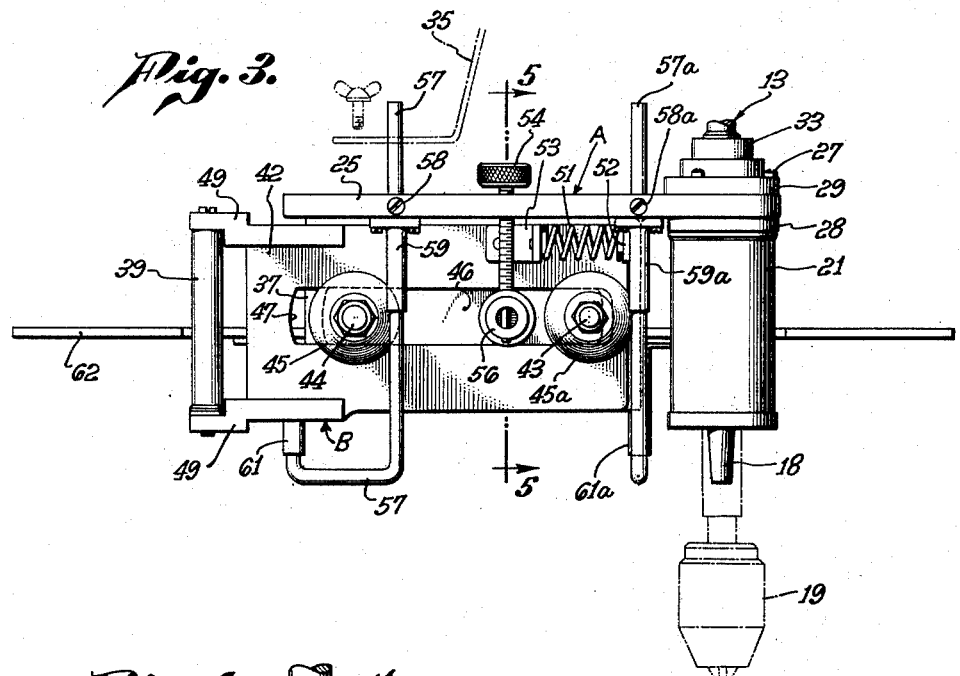
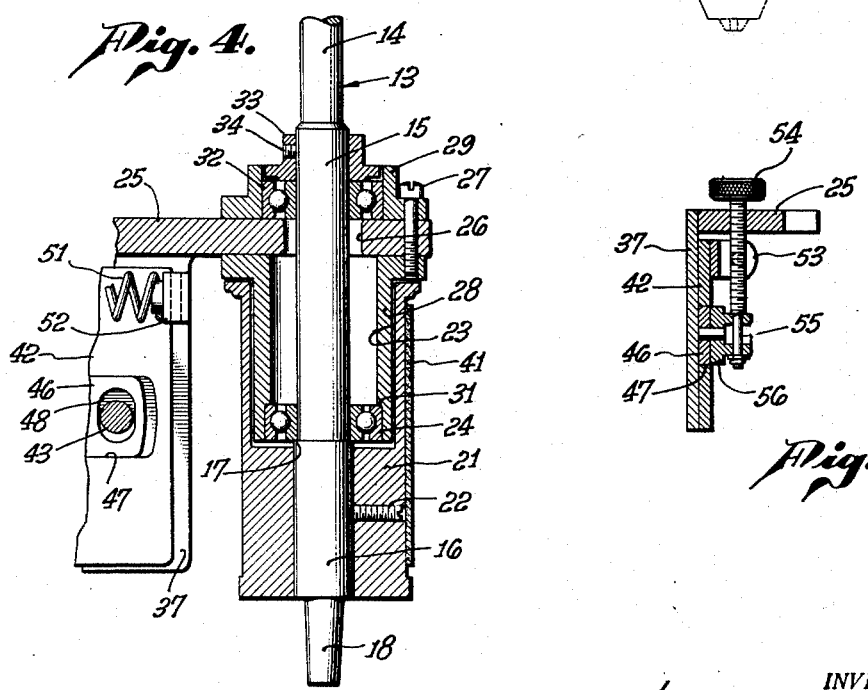
INVENTOR.
ELMER C. RUEHLE,
BY
ATTORNEY.

Jan. 16, 1951  E. C. RUEHLE  2,538,044
BELT SANDER ATTACHMENT FOR POWER TOOLS
Filed June 1, 1948  5 Sheets-Sheet 3

INVENTOR.
ELMER C. RUEHLE
BY Alfred W. Knight
ATTORNEY

Jan. 16, 1951          E. C. RUEHLE          2,538,044
BELT SANDER ATTACHMENT FOR POWER TOOLS
Filed June 1, 1948          5 Sheets-Sheet 4

INVENTOR.
ELMER C. RUEHLE
BY
ATTORNEY

Jan. 16, 1951      E. C. RUEHLE      2,538,044
BELT SANDER ATTACHMENT FOR POWER TOOLS

Filed June 1, 1948      5 Sheets-Sheet 5

INVENTOR.
ELMER C. RUEHLE
BY
ATTORNEY

Patented Jan. 16, 1951

2,538,044

UNITED STATES PATENT OFFICE 2,538,044

BELT SANDER ATTACHMENT FOR POWER TOOLS

Elmer C. Ruehle, Alhambra, Calif.

Application June 1, 1948, Serial No. 30,287

6 Claims. (Cl. 51—241)

1

This invention relates to belt sanding machines, and more particularly to a belt sanding attachment for support and operation by the power driven chuck of a power tool such as a drill press.

The present application is a continuation-in-part of my application for improvement in Belt Sander Attachment, filed March 5, 1946, Ser. No. 652,135, now abandoned.

An object of the invention is to make an improved and simplified belt sanding attachment for a power tool.

Another object is to provide a belt sanding attachment for support and power driving by the chuck of a power tool to which it is attached.

Another object is to drive and support a drum rotating shaft of a belt sanding attachment in the rotatable chuck of a power driven tool, and to support a work area of the sanding belt on a frame anchored against driving torque from a non-rotating element of the power driven tool.

Another object is to facilitate pivotal adjustment between head and tail drums of a belt sander to compensate for unevenness in the sanding belt, without materially changing the overall lateral separation between the axes of rotation of said drums.

Another object is to make a belt sanding attachment for a power tool having a power rotated chuck mounted on a non-rotating support, the attachment having a rotatable head drum spindle with an end thereof adapted to be gripped for support and rotation by such chuck; and having a tail drum shaft mounted laterally, substantially parallel to, and for pivotal and laterally separable adjustment from the head drum shaft, torque resistance and supplemental support for the tail drum shaft being derived from a non-rotating portion of the power tool.

Another object is to make a belt sander attachment for a power tool having a power driven chuck, the attachment comprising an intermediately articulated and extensibly adjustable frame, with a head drum and a tail drum mounted to pivot on substantially parallel axes on opposite ends of the frame, the head drum having a co-axial spindle extension adapted to be gripped, for support of the entire attachment and power rotation of the head shaft, in said chuck.

A still further object is to make a belt sanding attachment for a machine tool having a power driven chuck, whereby a rotatable belt actuating element of the attachment is gripped in such chuck for powered rotation thereby.

In order to attain these and other objects, there is provided in accordance with one feature of the invention, an assembly having a head sanding-belt drum pivoted in a frame extending radially from the drum, the head drum having an axial spindle portion thereof extending endwise therefrom and adapted to be gripped for driving connection and bodily support of itself and the frame, in the power driven chuck of a machine tool; a torque support being adapted to be secured to connect the frame of the belt sander attachment to a non-rotative chuck supporting element of the power tool, the frame having a tail drum pivotally mounted in the other end thereof from the head drum to pivot freely about an axis substantially parallel to that of the head drum, with means for tilting and laterally separating adjusting between the head and tail drum axes.

Another object is to make a belt sander attachment for mounting on and support by the chuck and quill of a drill press.

These and other features of the invention will be brought out in detail in the following description and the accompanying drawings, the first five figures of which comprise all the drawings of my previously filed application of which the present constitutes a continuation-in-part. In the drawings:

Fig. 3 is a side elevational view showing the opposite side of the attachment illustrated in Fig. 1, with the sanding belt removed to show the adjusting mechanism;

Fig. 4 is an enlarged fragmentary sectional view taken in the plane of the line 4—4 of Fig. 2;

Fig. 5 is a sectional view taken on the plane of the line 5—5 of Fig. 3;

Figure 1:
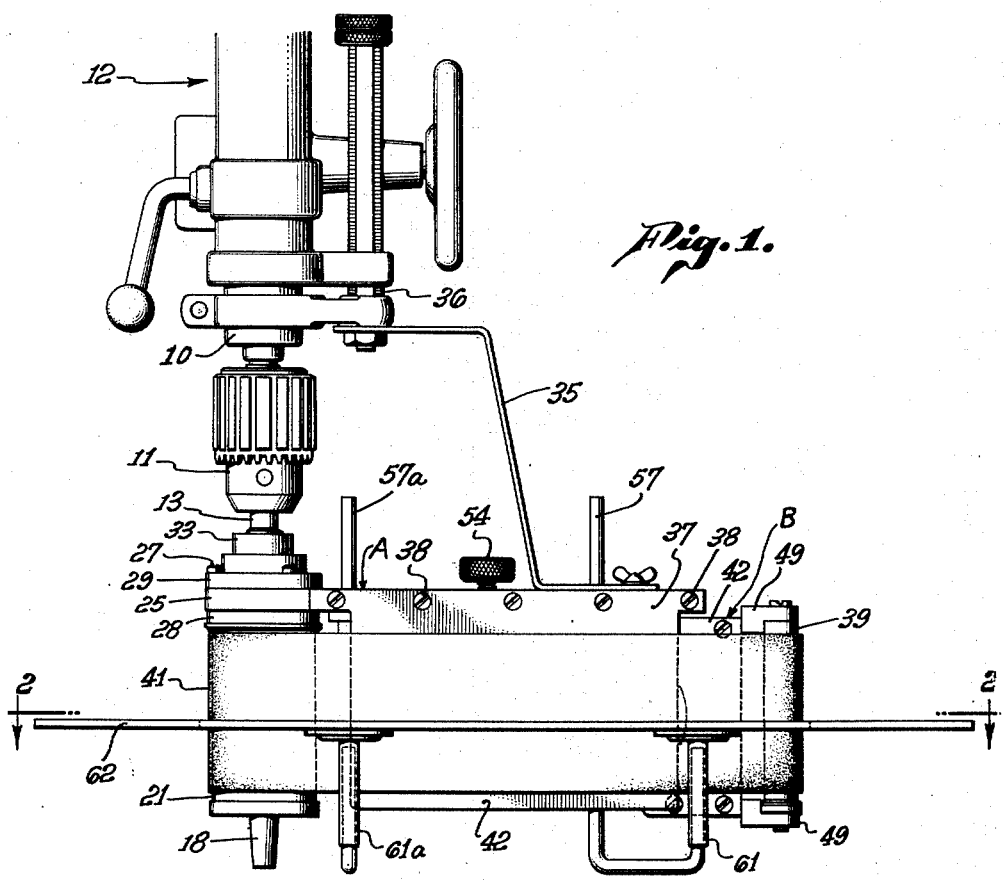
Fig. 1 is a side elevational view of one form of belt sander attachment embodying my invention, showing a fragment of a drill press to which it is attached for power driving and support.
Figure 2:
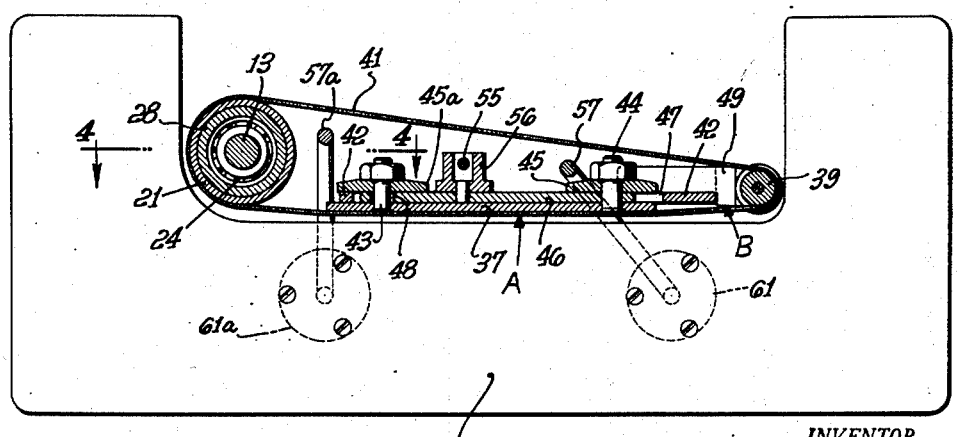
Fig. 2 is a horizontal sectional view taken in the plane of the line 2—2 of Fig. 1.

Referring first to the embodiment of the invention illustrated in Figs. 1 to 5 inclusive, the chuck 11 is the usual power driven chuck of a machine tool such as the drill press illustrated by the numeral 12 of Fig. 1.

A spindle 13 of the belt sanding attachment has an upwardly extending end portion 14 adapted to be inserted in, and gripped by, the chuck 11. As shown in Fig. 4 the spindle 13 has an enlarged central portion 15, and a further enlarged lower end portion 16, with a shouldered offset 17 therebetween for supporting the inner race of a lower ball bearing 24 thereon. The lower end of the spindle 13 has a tapered extension 18 upon which an additional device such as a chuck 19 may be mounted, as shown in Fig. 3.

A sanding belt head drum 21 has an axial bore portion in the lower end thereof as illustrated, closely to receive the large portion 16 of the spindle 13 therein. The head drum is secured to the shaft 13 to rotate therewith as by a set screw 22. The upper portion of the head drum has a larger axial bore portion 23 therein. The head drum is located axially of the spindle 13 so that the shoulder 17 is just above the offset between the smaller and larger bore portions in the head drum.

The device comprises broadly a primary or head drum assembly A and a secondary or tail drum assembly B which has combined slidable and pivotal adjusted connection thereto. A primary frame member 25 has an opening 26 therethrough freely to receive the shaft 13 therein, and has flanged tubular bearing support members 28 and 29 secured, in axial alinement with the opening 26, on opposite sides of the frame member 25.

The tubular bearing support members 28 and 29 are secured in position by machine screws 27 which pass through alined holes in the flanges of the bearing supports and the frame member 25. The lower end of the lower bearing support member 28 has an internal annular recess therein, the offset 31 between this recess and the bore of the tubular bearing support 28 forming a shouldered support engaging the outer race of the lower ball bearing 24.

An upper ball bearing 32 is mounted in the upper bearing support member 29, and has its outer race supported on the top marginal area of the frame member 25 around the spindle opening 26. A thrust collar 33 is fitted onto the intermediate portion 15 of the spindle 13 and is secured thereto by a set screw 34. The lower inner portion of this collar rests on the inner race of the ball bearing 32. The outer marginal area of the collar 33 is relieved to clear the outer race of the bearing 32.

Both the ball bearings 24 and 32 preferably are of the combined thrust and radial load bearing type. Thus the head drum 21 and its shaft are mounted for free rotation relatively to the frame member 25 and its connected parts, and at the same time will support the thrust imposed by the weight of the primary frame member 25 and its supported parts when the upper end portion 14 of the spindle 13 is inserted in and gripped by a power tool chuck 11.

To prevent rotation of the frame during a belt sanding operation, a torque member 35 is secured to the frame member 25 and to a non-rotating part of the power tool such as a depth gauge bracket 36 secured on the quill or non-rotating sleeve 10 of the drill press of Fig. 1, which moves vertically with the chuck in the conventional drill press. The torque member 35 may be a strip of band iron or other relatively light material having sufficient edgewise rigidity to resist the torque imposed by power operation of the attachment and pressure exerted by an operator in pressing a work piece against the sanding belt when in use. The entire weight of the attachment can be supported from the spindle 13 gripped in the chuck 11, so that the torque member need not be rigid in the direction of its thickness.

The primary frame member 25 has a side plate 37 secured thereto as by screws 38 and depending therefrom along or adjacent an edge thereof. The outer face of plate 37 is flat and substantially tangent to the head drum 28 and also to a tail drum 39 which is mounted as described hereinafter and is pivoted to rotate freely about an axis substantially parallel to, and laterally opposite, the head drum. Thus, when a usual flexible sanding belt 41 is mounted around the head and tail drums with its abrasive side out, the outer surface of the planiform frame portion 37 serves as a backing support or platen for a straight run of the belt between drums.

At its inner side, the plate 37 serves as a base for the supporting and adjusting mechanism for the tail drum 39. A secondary frame member, such as a flat plate 42, has an elongated slot 47 lengthwise therethrough. This slot is of a width slidably to receive an elongated guide member 46 therein. The guide member 46 is pivoted adjacent one end thereof, on a bolt 44, which is mounted in a hole in the side plate 37 of the primary frame member. The head of the bolt 44 is flush with the outer surface of the plate 37 so as not to interfere with the function of the plate in backing up the sanding belt during a work operation.

The other end portion of the guide member 46 from that pivoted on the bolt 44 has a vertically elongated slot 48 therethrough, best shown in Fig. 4. A second bolt 43, mounted in the frame member 37 similarly to the bolt 44, extends through this slot 48 so as to provide for pivotal adjustment of the guide member 46.

Large washers 45 and 45a are mounted on the bolts 43 and 44 respectively, to overlie the guide member 46 and the marginal areas of the frame member 42 alongside the slot 47 therein. The guide member preferably is slightly thicker than the secondary frame member adjacent the slot 47 therein. Therefore, after pivotally adjusting the guide member 46 the nuts of the bolts 43 and 44 may be drawn down tightly, so that the washers 45 and 45a will bind the guide member securely in adjusted position and will retain the secondary frame member 42 against outward displacement relatively to the side plate 37 of the primary frame. The slight difference in thickness between the guide member 46 and the secondary frame member 42 leaves a slight sliding clearance between the washers and the secondary frame member, leaving the latter free for endwise slidable movement under the impulse of a spring 51 for tautening the sanding belt 41.

The tail drum 39 is pivoted for free rotation about an axis substantially parallel to and laterally spaced from that of the head drum 21, by means of a shaft mounted in a yoke on the secondary frame structure. The yoke is provided by bracket arms 49 secured to extend endwise from opposite edges of the secondary frame member 42.

In order to maintain the sanding belt 41 under resilient tension during use of the attachment, the coil spring 51 is held in compression between a bracket 52, secured to the plate 37 of the primary frame member, and a bracket 53 secured to the secondary frame member 42. The action of this spring exerts a resilient separative force between the head and tail drum assemblies A and B, and thereby between the axes of the head and tail drums pivoted therein. The force of the spring should be such as to exert a required tension on the sanding belt, and to permit the secondary frame member 42 to be moved slidably toward the head drum shaft 13, by manual pressure on the outer end of the adjustable assembly B to retract or shorten the device for mounting or demounting a sanding belt. Outward extensible movement of the secondary frame member 42 under the impulse of the coil spring 50 is limited by the engagement of the inner end of slot 47 with the inner end of the guide member when no belt is mounted on the drum.

Small sanding belts of the character employed on the present attachment usually are glued up from strips of sand paper or emery cloth, and frequently are not of exactly the same length on both edges. Also, one edge of the belt sometimes tends to elongate after use. Adjustment for satisfactory use of such an uneven belt may be made by tilting the axes of the belt supporting drums relatively to each other about an axis substantially normal to the plane defined by the drum axes. Such tilting adjustment is provided by pivotal adjustment of the guide member 46 about the bolt 44 as an axis. This adjusts the angular position of the guide member relatively to the primary frame A, and in turn pivotally moves the secondary frame B through the secondary frame member 42. This tilts the axis of the tail drum 39 journaled in the secondary frame, relatively to the axis of the head drum journaled in the primary frame A.

To control the pivotal adjustment thus provided an adjusting screw 54 is threaded through a hole in the primary frame member 25. An unthreaded lower end portion 55 of reduced diameter of the screw 54 is journaled in a bracket 56. The bracket 56 in turn is pivotally mounted on the pivoted guide member 46. A spring clip or ring is mounted in an annular groove around the lower end of the unthreaded lower portion 55 of the screw 54 to prevent relative endwise movement between the screw 54 and the bracket 56. Axial threaded adjustment of the screw 54 upon loosening the bolts 43 and 44 to release the guide member 46, thus may be employed to adjust the pivotal position of the guide member 46 and its supported secondary frame member. This adjustment tilts the axis of the tail drum supported in the secondary frame assembly about the bolt 44 as an axis relatively to the axis of the head drum supported in the primary frame assembly A.

The pivotal frame articulation axis provided by the bolt 44 is substantially perpendicular to a plane containing the approximately parallel axes of the head and tail drums, and is located within the space between the two drums and intermediately of their ends. Slight angular deviation from an exact perpendicular positioning of the bolt 44 relatively to the common plane of the drum axes, in order to permit mounting the bolt in a convenient frame member, such as the member 37, does not noticeably affect the operation of the belt adjustment thus provided.

The relative tilting adjustment between the drum axes has the effect of shortening the distance separating the drums at one end thereof and lengthening the distance separating their other ends. Thus it will be seen that by locating the pivotal axis for adjustment within the space lying between the two sanding drums, and intermediately of their ends, adjustments to compensate for slight differences in length between opposite edges of a sanding belt can be accomplished without materially changing the lateral separation of the drums at their mid-portions.

The axis of pivotal frame adjustment, as defined by bolt 44, preferably is located in or closely adjacent to a plane perpendicular to the axis of the head drum at the mid-length of said drum.

A work support table 62, which is wholly supported from the frame of the attachment, is mounted on a support comprising rods 57 and 57a. These rods are inserted slidably and rotatably through holes in the primary frame member 25. Set screws 58 and 58a secure the rods in adjusted position. Tubular flanged guide members 59 and 59a, secured to the lower surface of the frame member 25, act to stiffen and brace the portions of the support rods 57 and 57a, while permitting vertical and angular adjustment thereof. The lower ends of the support rods are bent laterally at right angles to pass beneath the lower edge of the sanding belt and the frame structure, and then upwardly. A pair of tubular flanged receptacles 61 and 61a are secured to the lower side of the flat, U-shaped work support table 62. These receptacles are adapted to receive rotatably the upwardly bent ends of the support rods 57 and 57a to support the work table thereon. Release of the set screws 58 and 58a permits the work table to be raised or lowered and also to be swung toward or away from the belt, the difference in spacing between receptacles 61 and 61a and guides 59 and 59a permitting differential swinging movement of the two ends of the table 62.

It will be noted particularly in Fig. 1 that the axial spindle projection 14 of the head drum 21, when inserted in and gripped by the chuck of the drill press, supports the entire sander frame and work table structure in cantilever fashion from the spindle of the drill press, while the upwardly extending torque member 35 resists torque forces imposed on the device by the rotation of the head spindle and the travel of a sanding belt. It also resists such forces imposed by the pressing of a work piece against the sanding belt. Additionally, the torque member is placed in tension by forces tending to force the outer end of the sander frame downward, transmitting such forces to the quill of the drill press and thereby stabilizing and strengthening the attachment. By this arrangement the sander of the present invention can be mounted on a drill press almost as easily as the mounting of a drill therein, and needs no adjusting of the drill press table nor exterior support from extraneous objects or members.

The modified structure illustrated in Figs. 6 to 9 of the drawings is a presently preferred form of my invention. This modified form is adapted to be supported by, and to receive its driving impulse from, a power tool having a power rotated chuck such as the drill press 70 in Fig. 6 with its usual power driven chuck 71 mounted on a drill press spindle 71a. The drill press also has a usual non-rotative quill 71b in which the drill press spindle is journaled, and which moves vertically with the drill press spindle.

A head drum spindle 72 of a belt sander attachment has an upwardly projecting end portion 73 which is adapted to be inserted into and gripped by a rotatably driven power tool such as the drill press chuck 71.

The head drum spindle 72 has a head sanding-belt support drum 74 secured thereto as by having a close driving or press fit thereon. The head drum as illustrated is of die cast metal such as aluminum. It has a hub portion 74a with three radially projecting web spokes 74b and a cylindrical rim portion 74c. A rubber sheath 76 preferably is secured over the outer face of the rim to provide frictional engagement with a sanding belt when mounted thereon.

The head drum spindle 72 is journaled in ball bearings 77 and 78, which preferably are of the combined thrust and radial load type. The inner races of these bearings have a close fit on the spindle 72 and preferably are in contact with the ends of the hub portion of the head drum 74. While not so illustrated these bearings preferably are of a usual dust proof type, since in use the device produces a gritty dust harmful to exposed bearings.

Figure 9:
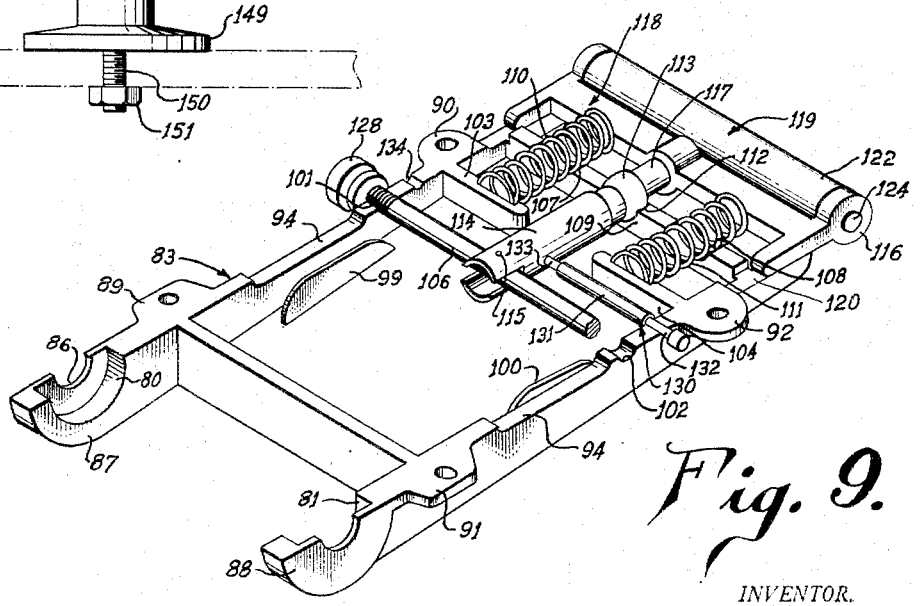
Fig. 9 is an isometric view of one half of a reversible two piece frame shown in Figs. 6 to 8 and including a tail drum and other parts associated therewith.

The outer races of both the ball bearings are seated in inwardly opening circular recesses, formed in a primary frame assembly 82 by the registering of two similar semi-circular recesses 80 and 81 in each of two similar reversible complementary primary frame half members 83 and 84 as best shown in Fig. 9. These recesses each have a web over the outer side thereof to resist outward thrust on a bearing mounted therein. A notch 86 is provided centrally of each of these webs to clear the shaft 72 and the inner races of the ball bearings when mounted thereon. The primary frame half members 83 and 84 preferably are die cast or molded from metal or suitable plastic material, although other methods of making them will of course readily occur to one ordinarily skilled in machine design.

Figure 8:
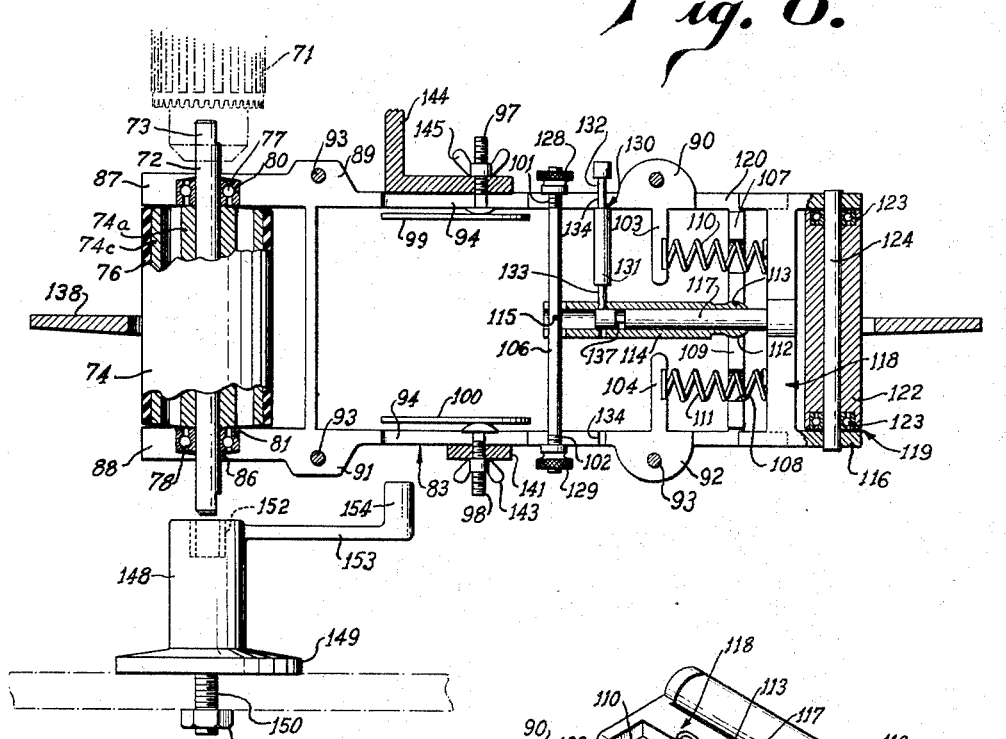
Fig. 8 is a sectional view taken on the plane of the line 8—8 of Fig. 7.

Briefly each primary frame half portion, of which the portion 83 is shown in Figs. 8 and 9, has a box-like central portion provided at its inner end with integrally formed upper and lower side wall bearing support extensions 87 and 88, between which the head drum 74 is located. These side wall extensions comprise a yoke which provides bearing support for the head drum bearings in the complementary semi-circular recesses 80 and 81 therein as previously brought out. These endwise extensions are of a length to provide adequate operating clearance between the periphery of the head drum and the end of the box-like central portion of the primary frame.

Figures 6, 7:
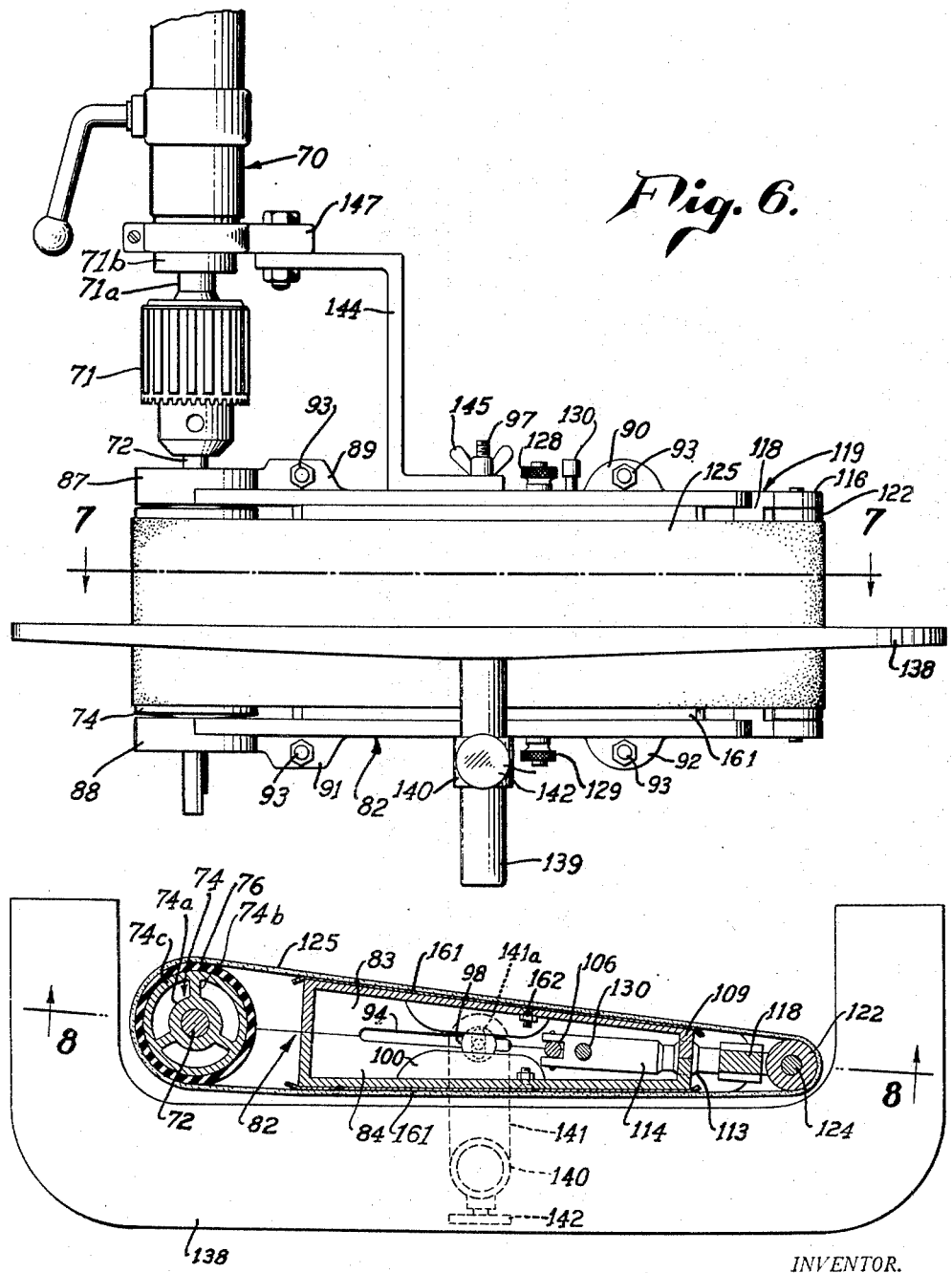
Fig. 6 is a side elevational view similar to Fig. 1, but showing a modified and presently preferred form of the invention.
Fig. 7 is a sectional view taken on the plane of the line 7—7 of Fig. 6.

Ears 89, 90, 91 and 92 are provided on the top and bottom sides of the frame half members and are located laterally opposite each other in pairs so as to register with each other when the frame halves are reversed and assembled as in Figs. 6 and 7. These ears have registering holes therethrough to receive securing bolts 93 by which the frame halves are secured together in this position, with the inner lateral faces of the two half members abutting each other along a median vertical plane extending longitudinally of the frame.

Elongated notches are provided in the edges of the side walls of the primary frame half members 83 and 84. These notches register with similar notches in the other frame half member when assembled therewith to form elongated slots 94 (see Fig. 7) at the top and bottom sides of the frame to receive carriage bolts 97 and 98 therein. Bolt head retaining flanges 99 and 100 are spaced inwardly from each slotted opening 94 a distance sufficient to receive the heads of the bolts 97 and 98 between the flange and the side of the frame. This retains the bolts with their square shank portions inwardly of their heads in the slot 94 to prevent the bolt from turning when screwing a nut on and off.

Semi-circular complementary recesses 101 and 102 are provided in opposed pairs in the top and bottom side walls of each box-like frame member. These recesses register with their corresponding opposites when the frame halves are assembled to receive the rounded end portions of a pivotal frame adjusting screw 106 for axial movement therein as will be brought out later herein.

A pair of spring supporting buttresses 103 and 104 are formed to extend inwardly from the top and bottom side walls and inwardly from the lateral side portion of each primary frame half member as shown in Fig. 9. Semi-circular complementary spring receiving notches 107 and 108 are provided in an outer end wall 109 of the primary frame half portions. These notches are in endwise alinement with the spring supporting buttresses 103 and 104 respectively to permit passage of belt tensioning springs 110 and 111 therethrough.

A central notch 112 of semi-spherical section is provided in the center of each end wall 109. The two central notches form, when two frame halves are assembled as in Figs. 6 and 7, a pivotal seat of spherical shape for the ball end portion 113 of a tubular guide member 114. This tubular guide member is notched at its inner end to receive the pivotal adjusting screw 106 therein. The adjusting screw is connected to the guide member 114 by a through pin 115 for limited pivotal movement relatively thereto.

A cooperating guide member, comprising a rod 117, has a sliding telescoping fit in the tubular guide member 114. The outer end of the cooperating guide member 117 is fitted securely into a hole in the transverse portion of an H-shaped secondary frame member 118.

Figure 10:
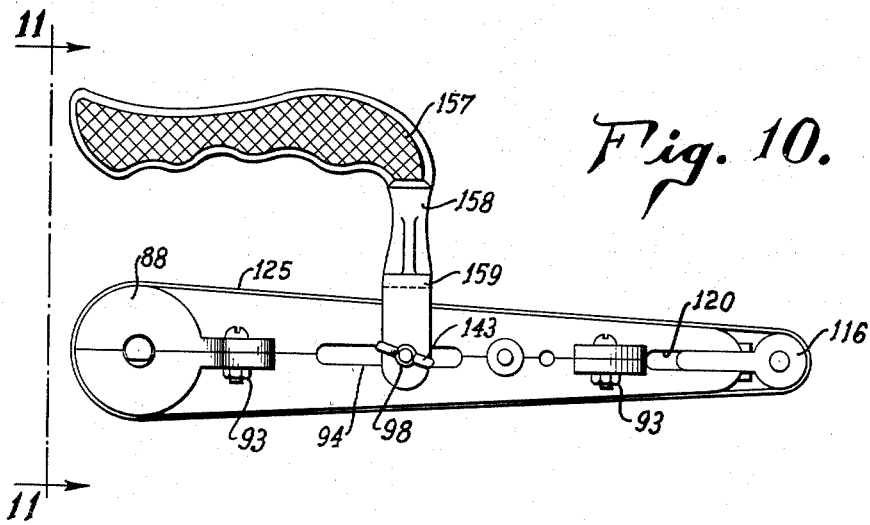
Fig. 10 is a side elevational view of a modified arrangement of the attachment, with a handle for hand sanding operation mounted thereon.

The inner ends of the top and bottom side portions of the H-shaped secondary frame member 118 fit slidably into endwise notches 120 in each side of the primary frame assembly 82, see Fig. 10. These notches are formed by pairs of registering recesses in each frame half member 83 and 84, see Fig. 9.

The outer end portions 116 of both the top and bottom sides of the H-shaped secondary frame member 118 are rounded to correspond with the ends of a cylindrical tail drum 122. The tail drum is pivoted on a shaft 124 which is mounted in openings centrally of the rounded frame end portions 116. The tail drum preferably is supported for free rotation on the shaft 124 by dust sealed ball bearings 123.

When a sanding belt 125 of proper length is mounted around the head and tail drums the coil springs 110 and 111 are held in compression between their supporting buttresses 113 and 114 on the primary frame assembly 82 and the H-shaped secondary frame member 118. The secondary frame assembly is indicated generally by the numeral 119. The force of these springs exerts an endwise separating or extending force between the primary and secondary frames and the axes of their supported head and tail drums respectively which produces tension on the sanding belt.

The primary frame half members 83 and 84 preferably are tapered from their inner or head drum supporting ends toward their outer or tail drum frame supporting ends. The amount of taper is determined by the relative diameters and the amount of separation between the axes of the head and tail drums. The taper of the frame preferably is such that both lateral sides of the frame are substantially tangent to both the head and tail drums when assembled therewith as best shown in Fig. 7.

When the device is assembled as described and the end portion 73 of the head drum spindle is gripped in the chuck 71 of the drill press as illustrated in Figs. 6 and 8, the frame made up of the two intersecured primary frame half members 83 and 84 and the pivotally adjustable secondary frame member 118 extends outward at one side of the head drum spindle below the chuck 71, the tail drum 122 being journaled on the frame at the outer end thereof for rotation about an axis generally parallel to the axis of rotation of the head drum spindle. In this position, the weight of the frame, together with the tail drum and other parts carried thereby, is supported on the head drum spindle by end thrust in the bearing means thereof, so that the entire device is supported and operated by the drill press.

A backing sheet or platen 161 of stiff, springy, abrasion resisting sheet material such as steel, is mounted to overlie the forward lateral face of the primary frame member 84 as shown in Figs. 6 and 7. This platen cover sheet is secured to the primary frame member 84 as by two small countersunk-head type through bolts 162. The heads of these bolts are flush with the platent sheet so not to interfere with the free running of the sanding belt 125 over them. The platen cover sheet has two important functions. First; it permits the use of relatively soft die castings which otherwise would tend to wear rapidly when subjected to the abrasive action of grit particles, which in use find their way between the sanding belt and the frame, under the pressure of a work piece held against the outer surface of the sanding belt. Second; since in use the sheet plate member 161 has been found to have a slightly resilient action under pressure of a work piece, it provides a better working surface which improves the action and apparently prolongs the life of the sanding belts. Additionally of course the platen plate can be replaced in case it ever should wear through, and since the area which is covered by the platen plate is the area of the attachment which is subjected to the most wear, even this third advantage is not negligible.

Both lateral sides of the frame back up the straight runs of the sanding belt between the drums and may be used if desired to provide platens or backing support for the sanding belt during a sanding operation against either side of the frame. This becomes important, for example, where one portion of a sanding operation requires table support while another portion does not. If desired an additional and similar backing support or platen covering sheet 161 may be mounted over the rear lateral face of the primary frame member 84, as illustrated in Fig. 7.

The secondary frame assembly 119 is guided in its endwise movement relatively to the primary frame 82 by the slidable movement of the guide rod 117 in the pivoted guide tube 114. Pivotal movement of the secondary frame assembly by the pivoted guide tube is limited however to movement about an axis substantially normal to the plane defined by the axes of the head and tail drums. This limitation of pivotal movement is provided by the slidable mounting of the top and bottom sides of the H-shaped secondary frame member 118 in the notches 120 in the primary frame 82. Thus, the secondary frame assembly and the tail drum carried thereby are pivotally movable in the median longitudinal vertical plane of the primary frame assembly, and the axes of both the head and tail drums are located in this median longitudinal plane.

Nuts 128 and 129 are screwed onto threaded ends of the pivotal adjusting member 106 for endwise adjustment thereof. Endwise movement of the member 106 swings the pivoted tubular guide member 114 and thereby pivotally moves the secondary frame assembly 119 mounted on the guide rod 117. The axis of such pivotal adjustment of the tail drum assembly extends perpendicular to the plane of the axes of the head and tail drums and passes through the center of the ball end portion 113 of guide tube 114. Thus in this case also the axis of pivotal adjustment is located between the head and tail drums and in a plane perpendicular to the axis of the head drum 74 at substantially the mid-length thereof.

For convenience in changing sanding belts, a latch is provided to retain the secondary frame assembly 119 in retracted position relatively to the primary frame assembly 82. This latch comprises a latch pin 130 having a central portion 131, and end portions 132 and 133 of reduced diameter. The small inner end portion 133 is mounted slidably in an opening in the side wall of the pivoted tubular guide member 114, having sufficient clearance from the edges of such hole to permit full required pivotal adjustment of the guide member 114. The reduced outer end portion 132 of the latch pin is mounted slidably in a hole formed by the registering of semi-circular notches 134 in the side walls of each primary frame half member in Fig. 9. The inner end of the latch pin is of a length and diameter to permit it to be pushed manually into an annular groove 137 around the slide rod 117 when the secondary frame 119 is pressed inwardly against the force of the springs 110 and 111 to fully retracted position.

When in this annular groove the latch pin is gripped in shear by the force of the springs 110 and 111 upon release of the retracting force, thereby latching the two frame members in their relatively retracted condition. To free the frames for extension under the force of the springs 110 and 111 the frame portions may again be pushed inwardly toward each other to release the latch pin from shear, whereupon the pin may be pulled outwardly out of the groove 137. In all other relative positions of the primary and secondary frames the inner end of the latch pin will ride on the surface of the cooperating guide rod 117 without restricting its movement.

A work support table 138, which may be of the same general type as that illustrated and described for the embodiment shown in Figs. 1 to 5 inclusive, has a downwardly extending support rod 139 connected thereto. This shaft is inserted for vertical slidable adjustment, in a collar 140, which is mounted on the end of a rigid metal bracket 141. The support rod 139 may be anchored in adjusted position in the collar 140 by a hand screw 142, see Fig. 7. The supporting bracket 141 has a longitudinally extending slotted opening 141a therein near its inner end, the opening being of a size to receive therein the shank of the lower carriage bolt 98 mounted in the primary frame lower slot 94 as previously described. A wing nut 143 threaded onto the bolt 98 grips the bracket 141 between the wing nut and the frame to secure the bracket in adjusted position.

The upper carriage bolt 97 is adapted to enter a hole in a torque member 144 which is gripped by a wing nut 145 and held in secured position against the top of the primary frame 82. The upper end of the torque member 144 may be secured to a bracket 147 mounted on the quill of the drill press 70 as previously described in connection with the structure of Fig. 1.

A supplementary support for bracing the attachment when unusually heavy work is to be performed, comprises a standard 148 having a flanged base 149 and a downwardly projecting threaded extension 150. The threaded extension is adapted to have a nut 151 threaded thereon to secure the bracing support to a stand such as the work table of a drill press. The standard 148 has a bushed hole 152 in the top thereof to provide bearing support for a downwardly projecting lower end portion of the head drum spindle 72. A laterally projecting arm 153 may be formed integrally with the standard 148. The arm 153 has an upwardly projecting lug 154 on the outer end thereof. This lug is of elongated cross section and is positioned to enter the lower slotted opening 94 in the primary frame to provide additional support, and to resist torque of the frame about the head drum spindle.

Figure 11:
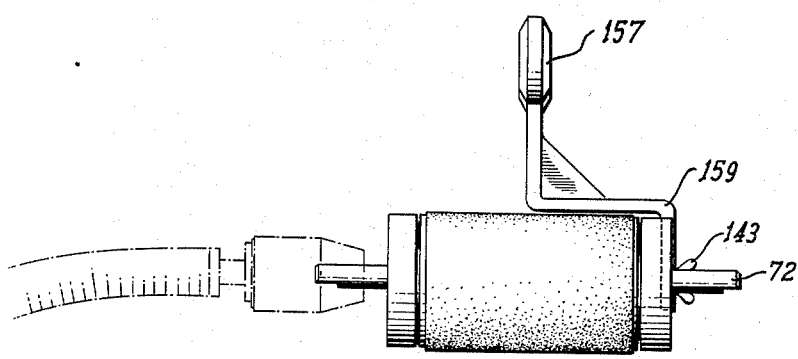
Fig. 11 is an end elevational view of a handle shown in Fig. 10.

In the further modification shown in Figs. 10 and 11 the attachment is adapted to perform hand sanding operations. In this modification, an entire belt sanding attachment similar to that shown in Figs. 6 and 7 is illustrated, except that the work table assembly and torque member 144 have been removed, and an operating handle 157 has been mounted on the attachment. The same reference numerals used in connection with Figs. 6 to 9 inclusive will therefore be used, as far as they apply, to the structure of Figs. 10 and 11.

In this latter modification the handle is shown as having a grip portion 157 mounted substantially parallel to and spaced upwardly from the primary frame assembly 82 of the sander.

The handle extends downwardly from the end of the hand grip portion 157, and from the lower end of this downwardly extending portion 158, a double right angle offset portion 159 is provided to extend over the top of, and clear of the sanding belt, and then downwardly alongside the primary frame 82 of the belt sander attachment. The lower end of the double offset portion 159 is secured to the primary sander frame 82 by the bolt 96 and its associated wing nut 143.

When arranged for hand sanding as shown in Figs. 10 and 11, the head drum spindle 72 may be gripped in the chuck of an ordinary hand drill driven as by electricity or compressed air, or in a chuck connected to a power driven tool through a usual flexible shaft. In this latter arrangement the belt sanding attachment would be operated by an operator grasping the handle 157 and holding the attachment to bring the sanding belt against a work surface.

While I have illustrated a preferred form of my invention in Figs. 6 to 9 inclusive and some principal modifications thereof, other modifications will occur at once to those skilled in the art of tool and machine design. It is desired therefore not to limit the invention except as defined in the following claims.

I claim:

1. A belt sanding attachment for support and operation by a power tool having a power driven spindle for rotation about a vertical axis and provided at its lower end with a chuck, said attachment comprising: a head drum shaft having a vertical axis; a primary frame projecting radially outward from said axis at one side of said shaft; end thrust and radial load bearing means interposed between said shaft and the inner end of said primary frame journaling and supporting said primary frame on said shaft with the vertical axis of the shaft in a median longitudinal plane of the primary frame, to support the frame on the shaft by end thrust in said bearing means and to permit rotation of said shaft relative to said frame about its vertical axis; said shaft having an end portion projecting upwardly beyond the frame to be gripped in the chuck of the power tool for support and rotation thereby, so as to support the frame in outwardly projecting position below said chuck; a head drum mounted on said shaft for rotation therewith and positioned adjacent the inner end of said primary frame; said primary frame being provided at its outer end with recesses defining a spherical pivot seat; a tubular guide member extending longitudinally of the primary frame and provided at its outer end with a ball portion mounted in said pivot seat for pivoted movement in said median longitudinal plane; a secondary frame disposed at the outer end of said primary frame, provided with a cooperating guide member extending inwardly in guided sliding engagement within said tubular guide member so as to provide for pivotal adjustment of said secondary frame relative to the primary frame by pivotal movement of said tubular guide member; a pair of springs disposed respectively above and below said guide members, engaging said primary and secondary frames to urge the secondary frame outward relative to the primary frame; said secondary frame having top and bottom sides whose inner portions slidably engage notches at the top and bottom sides of the primary frame to constrain the secondary frame to pivotal adjustment and longitudinal movement in said median longitudinal plane of the primary frame; an adjusting screw pivotally connected to the inner end of the tubular guide member and extending vertically and slidably through the top and bottom sides of the primary frame; two nuts engaging the projecting upper and lower ends respectively of said adjusting screw and bearing against the top and bottom sides respectively of the primary frame to move said adjusting screw upward and downward and thereby pivotally adjust and hold said tubular guide member and the secondary frame in any such pivotally adjusted position in said median longitudinal plane; and a tail drum journaled on said secondary frame for rotation about an axis lying in said median longitudinal plane and extending in a generally vertical direction as determined by the pivotal adjustment of said tubular guide; said head and tail drums being adapted to receive an operatively support a sanding belt.

2. A belt sanding attachment as set forth in claim 1, in which said cooperating guide member is provided with means defining a notch spaced outward from its inner end; said attachment further comprising a latch pin mounted for vertical sliding movement on said primary frame, projecting at its outer end through a side of the primary frame and having its inner end extending slidably through an opening in said tubular guide member at a position inwardly of said notch in the cooperating guide member when the secondary frame is urged outwardly by said springs to a normal operating position; said latch pin being movable vertically to bring said inner end thereof into and out of engagement with said notch in the cooperating guide member, when the secondary frame is moved inward against the action of said springs to a retracted position in which said notch is opposite said latch pin, and thereby retain the secondary frame in such retracted position.

3. A belt sanding attachment for support and operation by a power tool having a power driven spindle rotatable about a vertical axis and provided at its lower end with a chuck, said attachment comprising: a head drum shaft having a vertical axis; a frame projecting outward from said axis at one side of said shaft; end thrust and radial load bearing means interposed between said shaft and the inner end of said frame journaling and supporting said frame on said shaft to support the frame on the shaft by end thrust in said bearing means and to permit rotation of said shaft relative to said frame about its vertical axis; said shaft having an end portion projecting upwardly beyond the frame to be gripped in the chuck of the power tool for support and rotation thereby, so as to support the frame in outwardly projecting position below said chuck; said frame being provided with top and bottom side members each having a longitudinally extending slot at a position intermediate the inner and outer ends of the frame; a separate bolt extending vertically through the slot in each of said side members and movable longitudinally of the slot, each bolt having a head at its inner end engaging the inner face of the side member and having a threaded portion extending outwardly beyond the side member; a nut engaging the outwardly extending portion of each of said bolts so as to provide for adjustable attachment of another member to the frame by clamping engagement between the nut and the side member; a head drum mounted on said shaft for rotation therewith and positioned adjacent the inner end of said frame; and tail drum journaled on said frame at the outer end thereof for rotation about an axis generally parallel to the axis of said head drum shaft; said head and tail drums being positioned to receive and operatively support a sanding belt.

4. A belt sanding attachment as set forth in claim 1, in which each of said bolts is provided with a square shank portion engaged within the corresponding slot to prevent the bolt from turning, and the frame is provided with a flange spaced vertically inward from each of said slots in position to engage the head of the bolt to retain said square shank portion in non-rotative engagement within the slot.

5. A belt sander attachment for a power tool having a chuck, said attachment being adapted operatively to support a sanding belt and comprising: a primary frame composed of two identically shaped reversely positioned half members rigidily secured together, the outer lateral face of each frame half member being planiform, and the inner lateral face of each half member having cooperating complementary recesses therein to receive bearing means and a ball pivot element; a head drum spindle journaled on said frame in end thrust bearing means mounted in a pair of said complementary recesses, an end portion of said spindle projecting beyond said frame for operative insertion in and support by the chuck of a power tool; a head drum secured coaxially on said spindle opposite said primary frame to have the planiform outer faces of both of said frame half members tangent thereto; a guide member having a ball pivot element thereon pivoted in a pair of said complementary recesses in said primary frame half members for pivotal movement of said guide member about a pivot axis substantially perpendicular to the axis of rotation of the head drum spindle; a secondary frame having an end portion thereof slidably engaging said primary frame for endwise sliding and tilting movement in a median longitudinal plane of said primary frame perpendicular to said pivot axis; a cooperating guide member secured to said secondary frame and in sliding guided engagement with said pivoted guide member; spring means operatively engaging said primary and secondary frames resiliently to urge the frames apart; a tail drum journaled in said secondary frame for rotation about an axis disposed in said median longitudinal plane so as to have the planiform outer faces of said frame half members tangent to said tail drum; and adjustable means operatively engaging the primary frame and operatively connected to said pivoted guide member to tilt the secondary frame and its supported tail drum about said pivot axis.

6. A belt sander attachment for a power tool having a chuck, said attachment being adapted operatively to support a sanding belt and comprising: a primary frame composed of two identically shaped reversely positioned, hollow half members rigidly secured together, the outer lateral frace of each frame member being planiform, the frame half members joining on a median plane, and the inner lateral faces thereof having cooperating recesses therein to receive bearing means, a ball pivot portion, and a secondary frame; a head drum spindle journaled on said primary frame in end thrust bearing means mounted in a pair of said complementary recesses, the axis of said spindle lying in the median plane of juncture of said primary frame half members, an end portion of said spindle projecting beyond said primary frame for operative insertion in and support by the chuck of a power tool; a head drum secured coaxially of said spindle to have the planiform outer faces of said frame half members tangent thereto; a guide member having a ball pivot element thereon pivoted in a pair of said complementary recesses in said frame half members for pivotal movement of said guide member about a pivot axis substantially perpendicular to said median plane; a secondary frame having portions thereof slidably inserted in notches formed by pairs of said complementary recesses in said primary frame half members for endwise sliding and tilting movement relatively thereto in said median plane; a cooperating guide member secured to said secondary frame and in sliding guided engagement with said pivoted guide member; spring means operatively engaging said primary and secondary frames to urge the frames apart; a tail drum journaled in said secondary frame for rotation about an axis generally parallel to that of the head drum and in said median plane; and adjustable means operatively engaging the primary frame and connected to said pivoted guide member to tilt the secondary frame and its supported tail drum about said pivot axis.

ELMER C. RUEHLE.

REFERENCES CITED

The following references are of record in the file of this patent:

UNITED STATES PATENTS

| Number | Name | Date |
|---|---|---|
| 981,159 | Bein | Jan. 10, 1911 |
| 1,920,364 | Degen | Aug. 1, 1933 |
| 2,106,535 | Pattison et al. | Jan. 25, 1938 |
| 2,232,149 | Tautz | Feb. 18, 1941 |
| 2,272,273 | Parker | Feb. 10, 1942 |
| 2,370,864 | Kruger | Mar. 6, 1945 |
| 2,483,720 | Asbury | Oct. 4, 1949 |

Certificate of Correction

Patent No. 2,538,044 January 16, 1951

ELMER C. RUEHLE

It is hereby certified that error appears in the printed specification of the above numbered patent requiring correction as follows:

Column 2, line 10, for the word "adjusting" read *adjustment*; column 9, line 23, for "platent" read *platen*; column 12, line 54, for "an" read *and*; column 13, line 41, for the claim reference numeral "1" read *3*; column 14, line 23, for "frace" read *face*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*